United States Patent Office 3,387,007
Patented June 4, 1968

3,387,007
6β-METHYL-5α-ANDROST-2-EN-17-ONE AND
DERIVATIVES THEREOF
Raymond E. Counsell, Ann Arbor, Mich., and Paul D.
Klimstra, Northbrook, Ill., assignors to G. D. Searle &
Co., Chicago, Ill., a corporation of Delaware
No Drawing. Filed Mar. 8, 1966, Ser. No. 532,556
9 Claims. (Cl. 260—397.5)

ABSTRACT OF THE DISCLOSURE

6β - methyl - 5α - androst-2-en-17-one and derivatives thereof useful as hormonal agents as evidenced by their anabolic and androgenic properties and useful also as inhibitors of dicotyledonous seed germination.

---

The invention herein described pertains to novel steroidal derivatives characterized by a 6β-methyl substituent and by a doubly bonded linkage between carbon atoms 2 and 3. These substances are more particularly defined as 6β-methyl-5α-androst-2-en-17-one and related derivatives and are specifically represented by the following structural formula

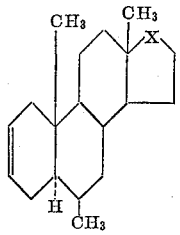

wherein X is a carbonyl or radical of the formula

Y being hydrogen or a lower alkanoyl or (lower cycloalkyl)(lower alkanoyl) radical, and Z is hydrogen or a lower aliphatic hydrocarbon radical.

Examples of the lower alkanoyl radicals symbolized by Y in the foregoing structural representation are formyl, acetyl, propionyl, butyryl, valeryl, caproyl, heptanoyl and the branched-chain groups isomeric therewith. The (lower cycloalkyl)(lower alkanoyl) groups smybolized also by that term are exemplified by cyclopentylpropionyl and cyclohexylbutyryl.

The lower aliphatic hydrocarbon radicals encompassed by the Z term are those within the scope of the following formulas $C_nH_{2n+1}$
$C_nH_{2n-1}$
$C_nH_{2n-3}$ wherein n is a positive integer less than 8. Specific examples of the lower alkyl radicals defined by the formula $C_nH_{2n+1}$ are methyl, ethyl, isopropyl and butyl, of the lower alkenyl radicals represented by $C_nH_{2n-1}$ are vinyl, propenyl and isobutenyl and of the lower alkynyl radicals denoted by the formula $C_nH_{2n-3}$ are ethynyl, propynyl and isopentynyl.

The compounds of the present invention are valuable pharmacological agents. They exhibit hormone-like activity, for example, as is manifested by their anabolic and androgenic properties. They are particularly suitable for that purpose by virtue of the absence of undesirable estrogenic side-effects. These compounds are, furthermore, inhibitors of dicotyledenous seed germination.

A convenient process for manufacture of the novel compounds comprising the present invention involves the utilization of starting materials represented by the following structural formula

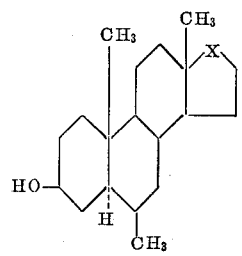

wherein X has the identical meaning hereinbefore disclosed. The 3-hydroxy group is converted to a suitable ester function, and the resulting esters are heated at elevated temperature, preferably in an inert organic solvent medium, to afford the desired Δ² compounds. Arylsulfonyl esters such as the p-toluenesulfonate are particularly suitable for that purpose. 3β-hydroxy-6β-methyl-5α-androstan-17-one is thus contacted at room temperature with p-toluenesulfonyl chloride in pyridine to yield the corresponding 3-p-toluenesulfonate, and that ester is heated in collidine solution at the reflux temperature, thus producing 6β-methyl-5α-androst-2-en-17-one.

The 17-esterified compounds of the present invention are conveniently produced by acylation of the instant 17-hydroxy substance. That compound, i.e. 6β-methyl-5α-androst-2-en-17β-ol, thus affords the corresponding 17-acetate when contacted with acetic anhydride in pyridine and the corresponding 17-(2-cyclopentylpropionate) when 2-cyclopentylpropionyl chloride is the acylating agent.

Reaction of the instant 17-ketone with the appropriate organometallic reagent results in the 17-(lower aliphatic hydrocarbon) substituted derivatives encompassed by the present invention. As a specific example, the addition of methyl magnesium bromide to that ketone results in 6β,17α-dimethyl-5α-androst-2-en-17β-ol. An additional example is the reaction with lithium acetylide to produce 17α-ethynyl-6β-methyl-5α-androst-2-en-17β-ol.

An alternate process available for manufacture of the instant 17-(lower alkenyl) derivatives involves partial reduction of the corresponding 17-(lower alkynyl) compounds. That transformation is readily accomplished by catalytic hydrogenation in pyridine solution. The aforementioned 17α-ethynyl-6β-methyl-5α-androst-2-en-17β-ol is thus shaken with hydrogen and 5% palladium-on-carbon catalyst in pyridine to afford 6β-methyl-17α-vinyl-5α-androst-2-en-17β-ol.

The invention is illustrated more fully by the examples which follow. These examples are given by way of illus-

Example 1

A mixture containing 10 parts of 3β-hydroxy-6β-methyl-5α-androstan-17-one, 10 parts of p-toluenesulfonyl chloride and 25 parts of pyridine is allowed to stand at room temperature for about 16 hours, then is poured carefully into a mixture of ice and water. The precipitate which forms is collected by filtration, washed on the filter with water and dried in air to yield 3β-hydroxy-6β-methyl-5α-androstan-17-one 3-p-toluenesulfonate.

The latter crude ester is dissolved in 500 parts by volume of collidine, and the resulting reaction mixture is heated at the reflux temperature for about 6 hours, then is cooled and poured into a mixture containing ice and excess 10% aqueous sulfuric acid. The resulting precipitate is isolated by filtration, then is washed on the filter with water. Further purification is effected by extraction into ether, washing of the ether solution with water, drying over anhydrous sodium sulfate containing decolorizing carbon and removal of the solvent by distillation under reduced pressure. The initially oily residue solidifies upon standing, then is recrystallized from aqueous methanol to yield 6β-methyl-5α-androst-2-en-17-one, melting at about 89–91°. This compound is represented by the following structural formula

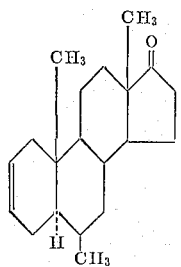

Example 2

To a solution of 3.5 parts of 6β-methyl-5α-androst-2-en-17-one in 162 parts of tetrahydrofuran is added 9 parts of lithium tri-(tertiary-butoxy) aluminum hydride, and the resulting mixture is stirred at room temperature for about 4 hours. At the end of that time the reaction mixture is poured into an ice-10% aqueous acetic acid mixture, and the precipitate which separates is isolated by filtration, washed on the filter with water and dried in air. Further purification of that product by recrystallization from methanol yields pure 6β-methyl-5α-androst-2-en-17β-ol, which displays a melting point at about 117–120° and an optical rotation, in chloroform, of +13.5°.

Example 3

A mixture containing one part of 6β-methyl-5α-androst-2-en-17β-ol, 10 parts of acetic anhydride and 20 parts of pyridine is kept at room temperature for about 16 hours, then is poured into ice cold water. The resulting aqueous mixture is cooled at 0–5°, and the precipitated product is collected by filtration, then washed with water. Purification of the resulting crude product by recrystallization from methanol affords 6β-methyl-5α-androst-2-en-17β-ol 17-acetate, melting at about 89–90° and exhibiting an optical rotation, in chloroform, of +1.5°.

Example 4

When an equivalent quantity of propionic anhydride is substituted in the procedure of Example 3, there is produced 6β-methyl-5α-androst-2-en-17β-ol 17-propionate.

Example 5

To a solution of one part of 6β-methyl-5α-androst-2-en-17-one in 17.5 parts of ether is added 25 parts by volume of 3 M ethereal methyl magnesium bromide, and the resulting reaction mixture is heated at the reflux temperature with stirring in an atmosphere of nitrogen for about 24 hours. At the end of that reaction period, the mixture is poured into saturated aqueous ammonium chloride containing ice, and that mixture is made acidic by the addition of dilute hydrochloric acid. That acidic aqueous mixture is extracted with ether, and the ether layer is separated, washed with water, dried over anhydrous potassium carbonate containing decolorizing carbon and concentrated to dryness by distillation under reduced pressure. The resulting glass-like residue is recrystallized from aqueous methanol to yield 6β,17α-dimethyl-5α-androst-2-en-17β-ol, melting at about 85–86.5°. It exhibits an optical rotation, in chloroform, of −3°.

Example 6

When an equivalent quantity of ethyl magnesium bromide is substituted in the procedure of Example 5, there is obtained 17α-ethyl-6β-methyl-5α-androst-2-en-17β-ol.

Example 7

To a solution of 2.5 parts of 6β-methyl-5α-androst-2-en-17-one in 67.5 parts of tetrahydrofuran is added 6.5 parts of the 30% lithium acetylide-70% ethylene diamine complex. Acetylene gas is then bubbled into the mixture for approximately 4 hours, following which time the reaction mixture is stirred for about 48 hours. Saturated aqueous ammonium chloride and water are successively added, and the resulting mixture is extracted with benzene. The organic layer is separated, washed successively with dilute hydrochloric acid and dilute aqueous sodium bicarbonate, then dried over anhydrous sodium sulfate containing decolorizing carbon. Removal of the solvent by distillation under reduced pressure results in a glass-like residue, which is purified by chromatography on silica gel followed by elution with 5% ethyl acetate in benzene. The eluted fraction is isolated and purified further by recrystallization from aqueous methanol to yield 17α-ethynyl-6β-methyl-5α-androst-2-en-17β-ol, which displays a melting point at about 130–133°.

Example 8

When an equivalent quantity of lithium 1-propynylide is substituted in the procedure of Example 7, there is produced 6β-methyl-17α-propynyl-5α-androst-2-en-17β-ol.

Example 9

A mixture containing one part of 17α-ethynyl-6β-methyl-5α-androst-2-en-17β-ol, 0.1 part of 5% palladium-on-carbon catalyst and 50 parts of pyridine is shaken with hydrogen at atmospheric pressure and room temperature until one molecular equivalent of hydrogen is absorbed. The catalyst is removed by filtration, and the filtrate is concentrated to dryness under reduced pressure to yield 6β-methyl-17α-vinyl-5α-androst-2-en-17β-ol.

Example 10

By substituting an equivalent quantity of 6β-methyl-17α-propynyl-5α-androst-2-en-17β-ol and otherwise proceeding according to the processes described in Example 9, there is produced 6β-methyl-17α-propenyl-5α-androst-2-en-17β-ol.

Example 11

To a solution of one part of 6β-methyl-5α-androst-2-en-17β-ol in 25 parts of pyridine is added dropwise, over a period of a few minutes, 2 parts by volume of 2-cyclopentylpropionyl chloride, and the resulting reaction mixture is stirred for about one hour. At the end of that time the reaction mixture is poured into a mixture of ice and water, then is extracted with ether. The ether layer is separated, washed successively with dilute hydrochloric acid and dilute aqueous sodium bicarbonate, then dried over anhydrous sodium sulfate containing decolorizing carbon. The dried organic solution is distilled to dryness under reduced pressure to yield 6β-methyl-5α-androst-2-en-17β-ol 17-(2-cyclopentylpropionate).

Example 12

The substitution of an equivalent quantity of 3-cyclohexylbutyryl chloride in the procedure of Example 11 results in 6β-methyl-5α-androst-2-en-17β-ol 17-(3-cyclohexylbutyrate).

What is claimed is:

1. A compound of the formula

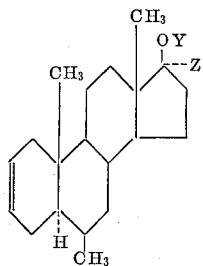

wherein Y is hydrogen or a radical represented by the formulas

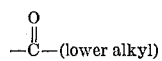

and

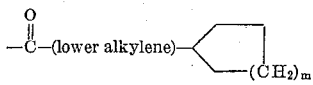

$m$ being a positive integer less than 3, and Z is hydrogen or a radical represented by the formulas

wherein $n$ is a positive integer less than 8.

2. As in claim 1, a compound of the formula

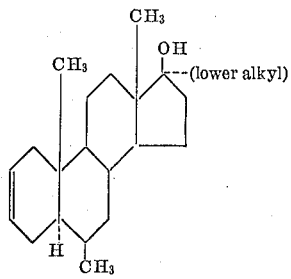

3. As in claim 1, a compound of the formula

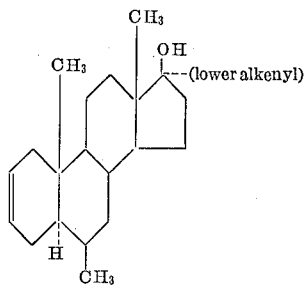

4. As in claim 1, a compound of the formula

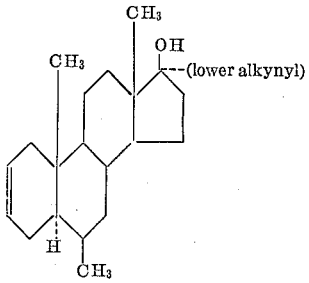

5. As in claim 1, a compound of the formula

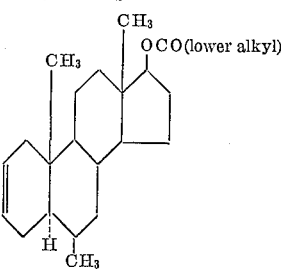

6. As in claim 1, the compound which is 6β,17α-dimethyl-5α-androst-2-en-17β-ol.

7. As in claim 1, the compound which is 6β-methyl-5α-androst-2-en-17β-ol.

8. As in claim 1, the compound which is 6β-methyl-5α-androst-2-en-17β-ol 17-acetate.

9. As in claim 1, the compound which is 17α-ethynyl-6β-methyl-5α-androst-2-en-17β-ol.

References Cited

UNITED STATES PATENTS 3,287,357  11/1966  Wechter et al. _____ 260—239.55
3,203,966  8/1965  Counsell et al.

OTHER REFERENCES

Velarde et al., J. Org. Chem. 24, pp. 311–313 (1959).

LEWIS GOTTS, *Primary Examiner.*

T. M. MESHBESHER, *Assistant Examiner.*